(12) United States Patent  
Kimbrell et al.

(10) Patent No.: US 8,693,836 B2  
(45) Date of Patent: Apr. 8, 2014

(54) HIGH CONDUCTOR COUNT PACKAGING CAPSULE

(75) Inventors: Eddie Kimbrell, Dacula, GA (US); Kyle Marchek, Greer, SC (US); Ted Lichoulas, Simpsonville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 92 days.

(21) Appl. No.: 13/146,088

(22) PCT Filed: Jan. 26, 2010

(86) PCT No.: PCT/US2010/022037
§ 371 (c)(1),
(2), (4) Date: Sep. 20, 2011

(87) PCT Pub. No.: WO2010/085777
PCT Pub. Date: Jul. 29, 2010

(65) Prior Publication Data
US 2012/0002934 A1 Jan. 5, 2012

Related U.S. Application Data

(60) Provisional application No. 61/147,265, filed on Jan. 26, 2009.

(51) Int. Cl.
*G02B 6/00* (2006.01)
(52) U.S. Cl.
USPC .......................................................... 385/135

(58) Field of Classification Search
USPC .......................................................... 385/135
See application file for complete search history.

(56) References Cited

U.S. PATENT DOCUMENTS

| 2,838,739 | A | 10/1958 | Winkler |
| 2,867,680 | A | 1/1959 | Stecher |
| 6,045,270 | A | 4/2000 | Weiss et al. |
| 6,195,477 | B1 | 2/2001 | Denuto et al. |
| 7,218,827 | B2 | 5/2007 | Vongseng et al. |
| 7,393,144 | B2 * | 7/2008 | Khemakhem et al. .......... 385/75 |
| 7,476,035 | B2 | 1/2009 | Cull et al. |
| 2005/0281526 | A1 | 12/2005 | Vongseng et al. |

OTHER PUBLICATIONS

Mexican Office Action issued Apr. 19, 2012 for counterpart Mexican Application No. MX/a/2010/010745.

* cited by examiner

*Primary Examiner* — Omar Rojas
(74) *Attorney, Agent, or Firm* — Sughrue Mion, PLLC

(57) ABSTRACT

A packaging apparatus for packaging a bundle of conductors, such as optical fibers, includes a housing having two U-shaped halves that attach to one another wherein at least one of the halves includes connecting portions that each retain a connector of the conductors. The method includes attaching the connectors of the conductors to the connecting portions of one half, gathering the conductors at a location beyond an end of the first half, and attaching the second half to the first half. The conductors extend through a conductor insertion hole formed in the housing when the two halves are attached to one another. A plurality of packaging apparatuses can be flexibly attached to one another in series.

20 Claims, 5 Drawing Sheets

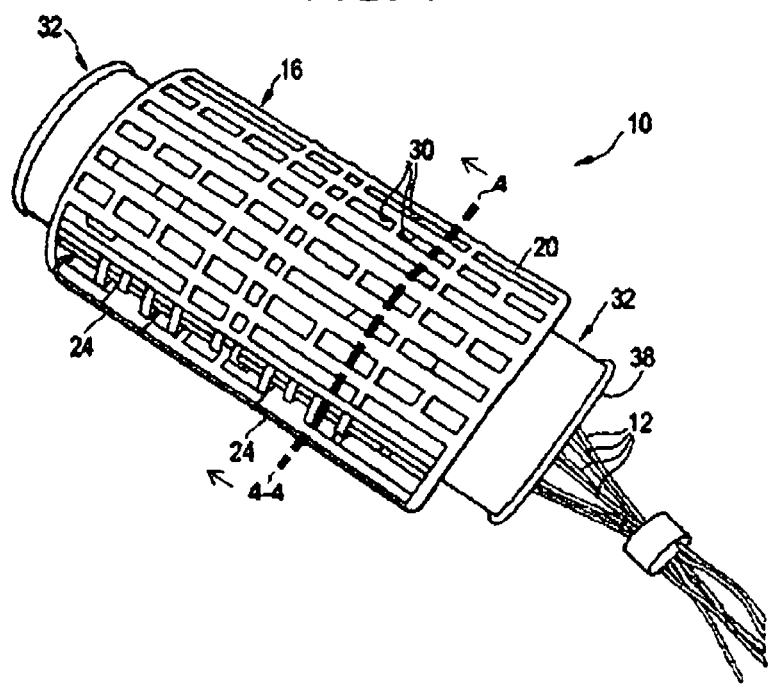
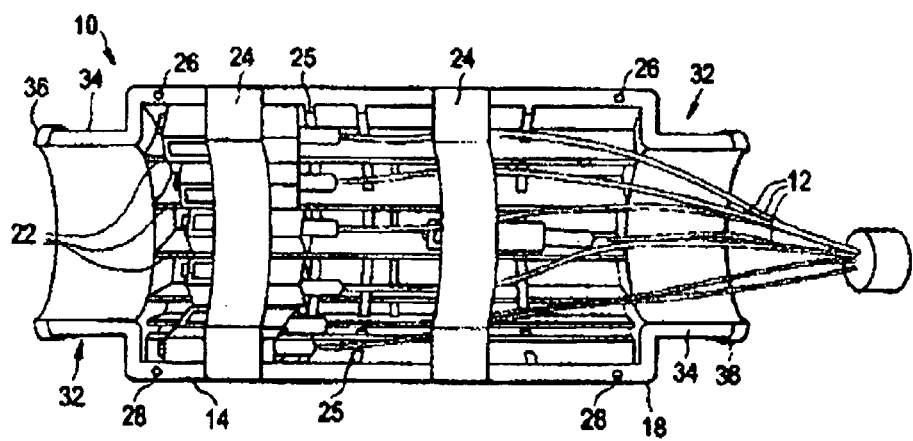

HIGH CONDUCTOR COUNT PACKAGING CAPSULE

BACKGROUND OF THE INVENTION

1. Field of the Invention

The present invention relates to a method of packaging conductors, such as optical fibers, having connectors for transporting the conductors with the connectors, and to a packaging apparatus to transport conductors having connectors. More specifically, the present invention relates to a method of packaging high conductors count connectors, and a packaging apparatus to transport high conductors count connectors.

2. Related Art

The conventional method of packaging High Fiber Count (HFC) fiber optic connectors, such as jumpers and pigtails, and in particular, those which include at least twenty-four connectors is complex. First, a plastic corrugated tube is cut to a break out length of the cable. Groups of twelve or more fibers, each having a connector at a distal end thereof, are gathered into a sub unit. The sub units are carefully threaded, or guided, through the plastic corrugated tube.

An end of the sub units is pulled out past an end of the corrugated tube, i.e., the corrugated tube is pushed beyond the break out length, so that the connectors and fibers can be prepared for packaging. The fibers and associated connectors within each sub unit are than gathered together and secured in a bundle using a tie, for example a tie having a hook and loop fastener. The tie is wrapped around the group of fibers at a location below an end of the connectors.

A set of the sub units are grouped together, for example, typically two sub units are grouped together. A plastic poly sleeve material is then threaded over the two subunits of cable. This is done on the remaining groups of sub units. The poly sleeve is gathered together at the connector end at a location below the end of the connector and secured with tape. The connector end of the poly sleeve is then heat sealed closed. At the opposite end of the poly sleeve, the sleeve is folded and secured to the cable with tape. This is repeated on all sub units.

The lengths of each sub unit must be different so that all of the connectors are not grouped at a single location. Furthermore, it is desirable to minimize the amount of plastic corrugated tube needed to protect the fibers. Accordingly, several radius controller devices are used.

The radius controller is a device that is used to control the bending radius of the fiber when the breakout lengths of the cable are folded back over the device. Thus, the radius controller devices simulate staggered breakout lengths. Furthermore, the total length of the grouped sub units of fibers is significantly reduced (in total length) when folded back over the radius devices.

Tape is wrapped around the poly sleeve material below the radius controller device to secure the radius controller device in place with the group fibers bent around the device. This is done on all groups of subunits.

The plastic corrugated tube is then carefully pulled back over the bundle of subunits. Plastic mesh material is used as end caps for the corrugated tube. The mesh is secured to the corrugated tube with tape.

The reverse process is performed to unpackage the fiber bundles.

However, the conventional method is very time consuming and complicated both in packaging and unpackaging. Furthermore, the fibers may break or become kinked during installation and/or removal from the corrugated tube. In particular, when the plastic tube is pulled over the bundled cables of connectors, the connectors may get caught in the tube which in turn will damage the fiber. Also, since the fibers are tightly connected to one another with tape and the radius controller device, if one fiber becomes caught or is otherwise pulled, there is a high likelihood that the fiber will break or become damaged.

In addition, after the cable assembly is packaged, the conventional technology does not allow the manufacturing facility to verify that the fiber is not kinked or otherwise damaged.

Also, the current technology does not organize the connectors in a concise small package, but is instead large and bulky in size and shape. In fact, the conventional packaging with the corrugated tube is sometimes too large to pull through cable ductwork, raceways, or conduits in the field. In addition, the existing technology is also not modular in design, and thus cannot be easily grouped and ungrouped with other such packages of fiber bundles causing additional bulkiness in transport. Further, the current technology is expensive.

Accordingly, there is a need for a simplified method of packaging fiber bundles that is more time and cost efficient than the conventional method and which provides adequate protection of the fibers. There also is a need for an improved packaging apparatus.

SUMMARY OF THE INVENTION

One aspect provides a conductors packaging apparatus for packaging a plurality of conductors that each have a connector disposed at a distal end thereof. The conductors could include both optical fibers and electrical wires. The apparatus includes a housing including a first half and a second half detachably attached to the first half, wherein the first half and the second half each include a plurality of connecting portions at an inner surface thereof that each retain one of the connectors.

The first half and the second half may each having a substantial U-shape in cross section, and the first half and second half of the housing may form a hollow cylindrical shape when attached to one another. The housing may include a plurality of holes.

An attachment portion may extend from at least one end of the housing, wherein the housing is attachable to a housing of another apparatus. The attachment portion may limit a number of degrees of freedom of the housing relative to the another apparatus.

The housing extends along a longitudinal axis and the connecting portions may be radially spaced about the longitudinally axis of the housing.

A total number of the connecting portions of the housing may be twelve.

A U-shaped slot may be formed at each end of each half of the housing to define a conductor insertion hole in each end of the housing when the first half and the second half are attached to one another.

A plurality of stoppers may extend inwardly from the inner surface of the first half and from the inner surface of the second half that restrict movement of the connector within the connecting portion.

A conductor packaging assembly may include a plurality of the conductor packaging apparatuses attached to one another in series. Each two adjacent ones of the conductor packaging apparatuses may be attached to one another to form an articulated assembly. A conductor slack storage spool may be attached to an end of one of the conductor packaging apparatuses.

Another aspect provides a method of packaging a plurality of bundles in a plurality of respective housings each having a first half and a second half, wherein each of the bundles includes a plurality of conductors, and each conductor includes a connector at a first end thereof. The method includes attaching the connectors of the conductors of a first bundle among the plurality of bundles to one of the first half and the second half of a first housing among the plurality of housings; gathering the conductors attached to the first housing at a location beyond an end of the first housing; and attaching the second half of the first housing to the first half of the first housing to form a package of the first bundle, wherein the conductors of the first bundle extend through a conductor insertion hole formed in the first housing.

The method may further include attaching the connectors of the conductors of a second bundle among the plurality of bundles to one of the first half and the second half of a second housing among the plurality of housings; gathering the conductors attached to the second housing at a location beyond an end of the second housing; placing the conductors of the first bundle over the first half of the second housing; and attaching the second half of the second housing to the first half of the second housing to form a package of the second bundle, wherein the conductors of the first bundle and the second bundle extend through a conductor insertion hole formed in the second housing. The method may also include attaching the first housing to the second housing.

One object of the exemplary embodiments is to provide a method of packaging conductor bundles that is simplified, that requires less time, and that costs less than the conventional method, and an apparatus for use in such method. Another object is to provide a package that allows for easy and compact packaging of a plurality of packing apparatuses. Another object is to provide a method and a package that prevents damage to the conductors if one of the conductors is caught or pulled. Another object is to provide a package that is easily pulled through ductwork, conduit and raceways commonly found in the field and buildings. Yet another object is to allow a production worker to verify that the conductor is not kinked during the packaging process without requiring that the conductor bundles be first unpackaged.

Another object of the exemplary embodiments is to provide a means for the installation technician to observe the cable assembly for kinks or other issues that would require repair prior to installing the cable assembly. The housing may also be opened up as required by the customer if there is a desire to optically test the cable prior to cable installation.

BRIEF DESCRIPTION OF THE FIGURES

The following is a brief description of the Figures, in which like elements are referred to with like reference numerals.

FIG. 1 is perspective view of an exemplary embodiment of the fiber packaging apparatus;

FIG. 2 is front view of a first half of the housing of the exemplary embodiment of FIG. 1 illustrating a retainer clip;

DETAILED DESCRIPTION OF THE EXEMPLARY EMBODIMENTS

Figure 3:
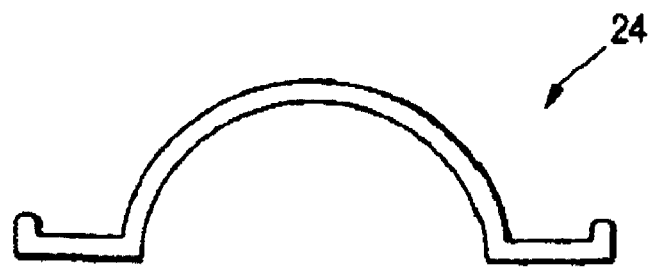
FIG. 3 is a side view of an exemplary embodiment of a retainer clip of FIG. 2.

Exemplary embodiments of the present invention overcome the above disadvantages and other disadvantages not described above. Also, the present invention is not required to overcome the disadvantages described above, and an exemplary embodiment of the present invention may not overcome any of the problems described above.

The embodiments below refer to examples where the conductors are optical fibers. However, embodiments would also be applicable to conductors that are electrical wires. FIG. 1 is perspective view of an exemplary embodiment of the fiber packaging apparatus 10. The fiber packaging apparatus 10 packages a plurality of optical fibers 12 that each have a fiber optics connector 14 (for example, SC, FC, ST, and LC connectors) disposed at a distal end thereof, wherein the packaging apparatus 10 is attached to the high fiber count cable which includes the fibers 12.

The packaging apparatus 10 includes a housing 16 that has a first half 18 and a second half 20 detachably attached to the first half 18. The first half 18 is shown in FIG. 2, however the second half 20 may be substantially identical to the first half 18.

The first half 18 and the second half 20 each include a plurality of connecting portions 22 at an inner surface thereof that each retain one of the connectors 14. In the exemplary embodiments, a total number of the connecting portions 22 of the housing is twelve. The total number of the connecting portions 22 is not limited to twelve, and may for example be 6, 18, or 24, or some other number. FIG. 2 illustrates six connecting portions 22 on the first half 18. The connecting portions 22 extend in a longitudinal direction along which the fibers extend and allow the connectors of the fibers to move slightly along the longitudinal direction. As such, if a fiber becomes caught during packaging, transport, or unpackaging, the fiber connector is permitted to move to a certain extent such that the fiber is not damaged. The plurality of connecting portions 22 are radially spaced about a longitudinal axis of the housing 16.

Figure 4:
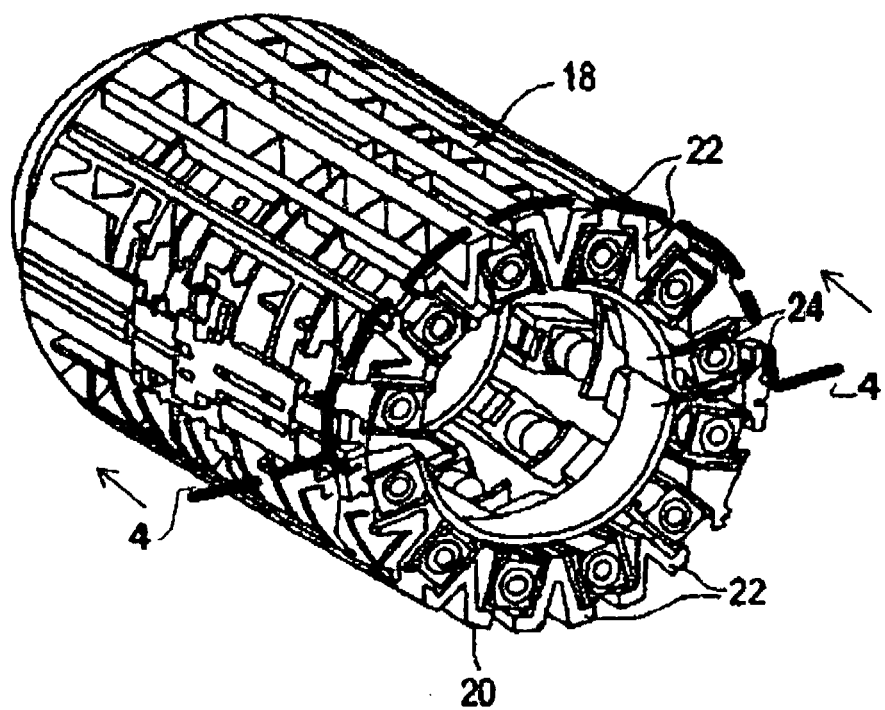
FIG. 4 is a perspective view of the exemplary embodiment of FIG. 1 partially cut away at line 4-4 of FIG. 1.

The connecting portion 22 may be a projection, or projections, or a slot on an inner surface of the housing 16 that allows a connector 14 to be placed thereinto or to fit thereinto, but is not so tight as to prevent longitudinal movement of the connector within connecting portion 22. FIG. 4 illustrates a plurality of projections, wherein one of the connectors 14 fits between two adjacent projections. Alternatively, the connecting portion 22 may be an indent in the inner surface of the housing 16 having a shape that mirrors an outer surface of the connector 14. However, those skilled in the art would understand other configurations for the connecting portions 22 that would retain the connectors 14 while allowing some longitudinal movement.

As shown in FIGS. 2, 3, and 4, a retaining clip 24 is disposed on each of the first half 18 and the second half 20 to cover at least a portion of the connecting portions 22. The retaining clip 24 has an outer surface that engages an inner surface of the housing 16. In the exemplary embodiments, the retaining clip 24 has a U-shaped contour having flanges extending from the ends thereof, as shown in FIG. 3. The U-shaped contour matches the shape of the inner surface of the housing 16 and the flanges are disposed between the two halves 18, 20 of the housing 16, whereby the retaining clips 24 are retained in place between the two halves 18, 20 of the housing 16. With the retaining clip 24, the connecting portions 22 may hold the connectors 14 more loosely than without the retaining clip 24 because the retaining clip 24 keeps the connectors 14 against the inner surfaces of the housing 16 even when the connectors 14 slide within the connecting portions 22.

A stopper 25 may extend inwardly from an inner surface of the housing 16 at a location spaced from the connecting portion 22 in the longitudinal direction of the fibers for stopping the connector 14 from moving along the longitudinal direction more than a predetermined amount of movement. That is, the stopper 25 permits the connectors 14 to move longitudinally only to a certain extent within the housing 16. As shown in FIG. 2, the stopper 25 is a projecting portion that extends slightly into the longitudinal movement path of each of the connectors 14.

The first half 18 and the second half 20 each have a substantial U-shape in cross section or a half-moon shape, as best shown in FIG. 4. The first half 18 and second half 20 of the housing 16 form a hollow cylindrical shape when attached to one another. The fibers 12 and respective connectors 14 are housed within an inside of the hollow cylindrical shaped housing 16.

The first half 18 includes a plurality of projections 26 on one side of the surface that engages the second half 20, and a plurality of slots 28 on the other side of the surface that engages the second half 20, wherein the slots 28 match the shape and location of the corresponding projections 26. The second half 20 similarly includes the projections 26 and slots 28. By this arrangement, the two halves 18, 20 can be aligned with one another and retained against one another through engagement between the respective slots 28 and projections 26.

The first half 18 and the second half 20 include a plurality of openings 30 such that the optical fibers 12 and connectors 14 can be visually observed through the housing 16 while the two halves 18, 20 of the housing 16 are connected to one another. In the exemplary embodiments, this is accomplished by forming the housing 16 out of a plurality of horizontally and vertically extending supports that are connected at the intersections thereof to form a frame-like structure. With this frame-like structure, the connecting portions 22 and the stopper 25 may be extensions of the frame, whereby the entire housing may be easily manufactured.

An attachment portion 32 extends from at least one end of the housing 16, wherein the housing 16 is attachable to a housing 16 of another apparatus 10. As best shown in FIGS. 1 and 2, the attachment portion 32 may be a cylindrical flange 34 having a lip 36 at a distal end thereof. The attachment portion 32 limits a number of degrees of freedom of the housing relative to the another apparatus. For example, the attachment portion 32 may allow two adjacent housings 16 to flex or bend to a limited degree relative to one another in any direction, thereby allowing the attached housings 16 to wind or snake through radiused ducts and raceways.

As illustrated in FIGS. 1, 2, and 4, the housing 16 includes a fiber insertion hole 38. The fiber insertion hole 38 is defined by a U-shaped slot formed at each end of each half 18, 20 of the housing 16. Thus, when the two halves 18, 20 are attached to one another, a fiber insertion hole 38 is formed at each end of the housing 16.

Figure 5:
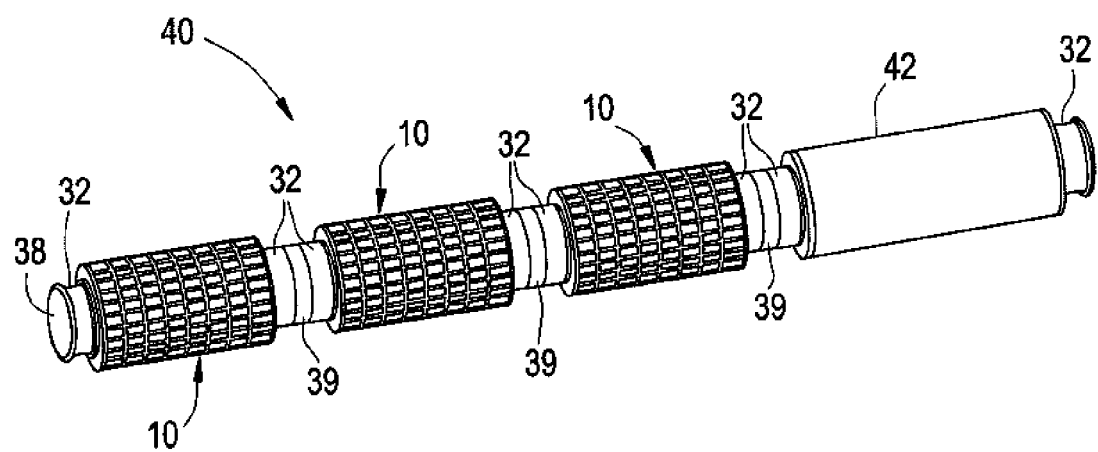
FIG. 5 is a perspective view of a fiber packaging assembly illustrating a plurality of the exemplary fiber packaging apparatuses of FIG. 1 and a fiber slack storage container.
Figure 6:
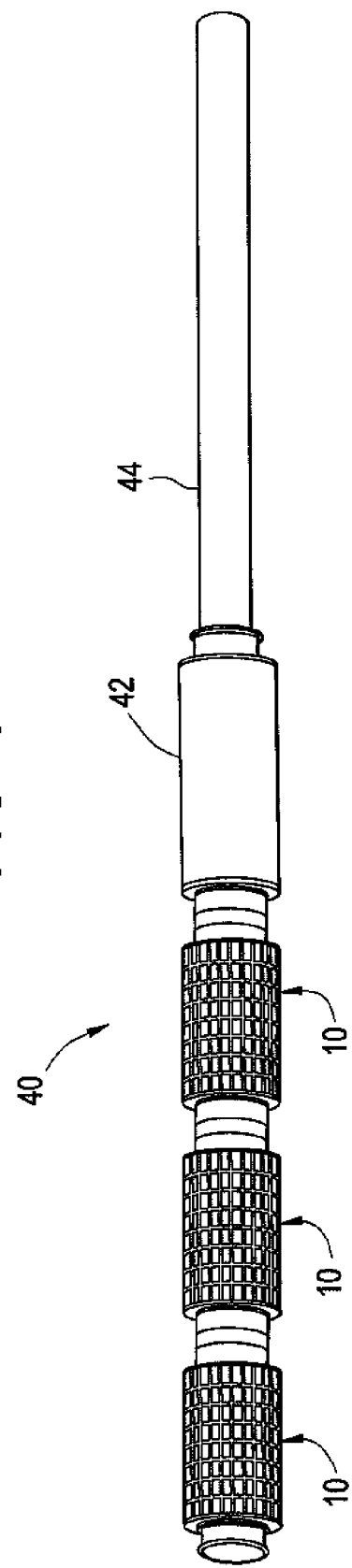
FIG. 6 is a perspective view of an alternative embodiment of FIG. 5 illustrating a cable.

As shown in FIGS. 5 and 6, a fiber packaging assembly 40 may be formed by attaching a plurality of the fiber packaging apparatuses 10 to one another, for example through a plurality of union rings 39. The lip 36 is attachable to either end of a union ring 39, wherein two lips 36 can be attached to a single union ring 39 to attached two apparatuses 10 to one another, as shown in FIGS. 5 and 6. Those skilled in the art would understand other configurations for attaching two adjacent apparatuses 10 to one another. For example, the attachment portions 32 of two apparatuses 10 may directly attach to one another without the use of a union ring 39. The union rings 39 allow a certain amount of movement or flexibility between the two connected packaging apparatuses 10 and minimize rotation. Furthermore, attaching a plurality of the fiber packaging apparatuses 10 to one another through a plurality of union rings 39 creates an articulated packaging assembly, i.e., there is flexibility between two adjacent packaging apparatuses 10 connected through the union ring 39, wherein the articulated assembly will follow the radiused ducts and raceways encountered during typical cable installations.

A fiber slack storage spool 42 may be attached to an end of one of the line of fiber packaging apparatuses 10, or an end of a single fiber packaging apparatus 10, to take up slack in the optical fibers 12. The spool 42 allows manipulation and storage of the excess fiber breakout lengths commonly associated on cable assemblies from different customers. FIG. 6 illustrates a cable 44 extending from an end of the fiber slack storage spool 42 away from the packaging apparatuses 10.

Figure 7:
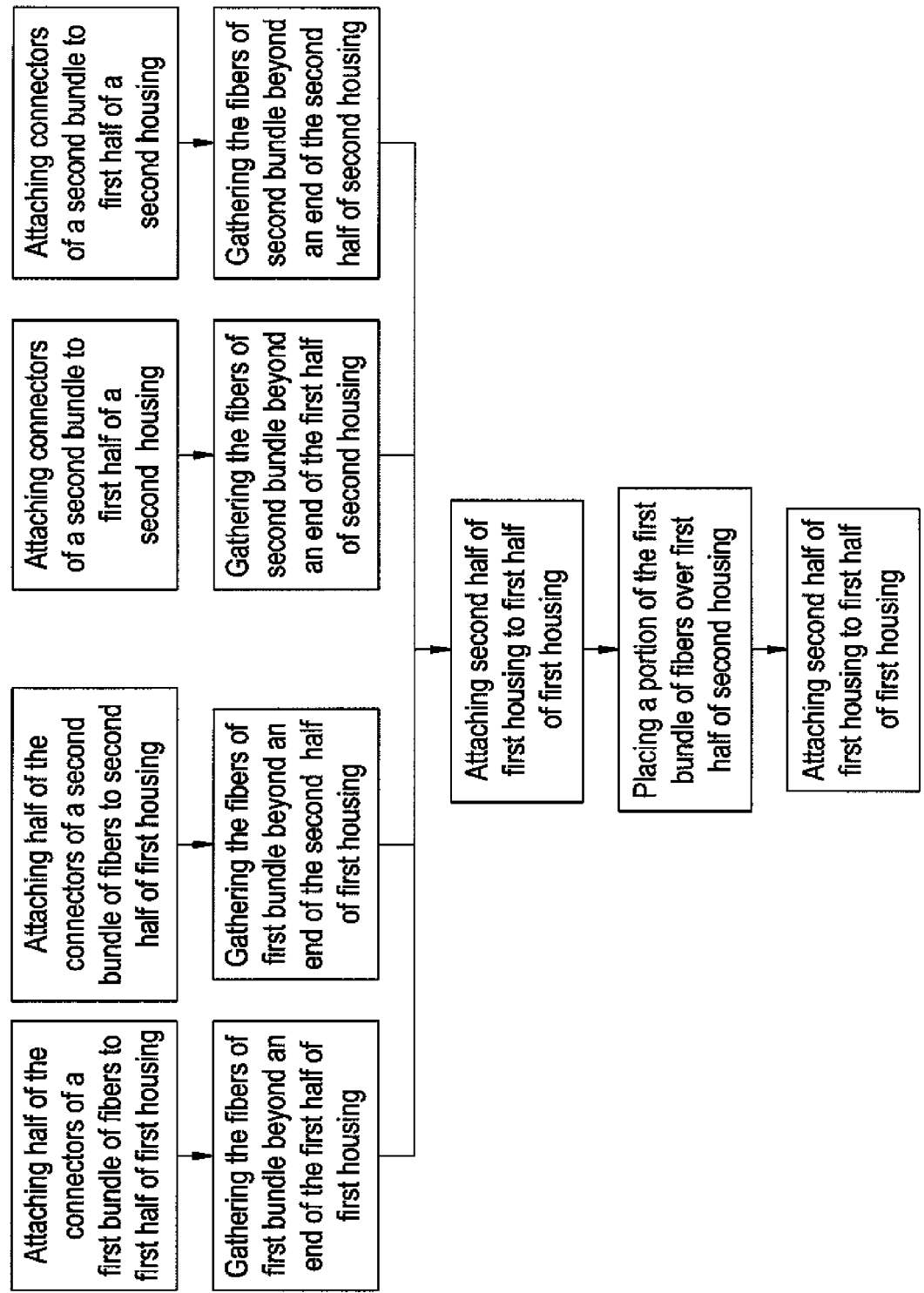
FIG. 7 is a flow diagram of an exemplary embodiment of the method of packaging bundles of fibers.

FIG. 7 illustrates an exemplary embodiment of a method of packaging a plurality of bundles of optical fibers 12. In operation, to package a single, first bundle of optical fibers 12, the connectors 14 of the optical fibers 12 of the first bundle are attached to the first half 18 of a first housing 16 and/or the second half 20, of the housing 16. In the exemplary embodiment, half of the connectors 14 are attached the first half 18 and half of the connectors 14 are attached to the second half 20. The optical fibers 12 are gathered at a location beyond an end of the respective half of the housing 16 to which the fibers 12 are attached, as best shown in FIG. 2. The second half 20 of the first housing 16 is attached to the first half 18 of the first housing 16 to form a package of the first bundle, as shown in FIG. 1. Once the package is formed, the optical fibers 12 of the first bundle extend through a fiber insertion hole 38 formed in the first housing 16.

To form a fiber packaging assembly 40 that includes a plurality of fiber packaging apparatuses 10, the optical fibers 12 of the first bundle that extend through the fiber insertion hole 38 of the first housing 16 are placed on the first half 18 of a second housing 16, after the first package has been formed. The connectors 14 of the optical fibers 12 of a second bundle are attached to the first half 18 and the second half 20 of the second housing 16, in a similar manner as the first bundle was attached to the first housing. This may be done before or after the optical fibers 12 of the first bundle are laid over the second housing 16. The second bundle of optical fibers 12 are gathered at a location beyond an end of the respective half of the second housing 16 to which the fibers 12 are attached. The second half 20 of the second housing 16 is attached to the first half 18 of the second housing 20 to form a package of the second bundle. Once the second package has been formed, the optical fibers 12 of both the first bundle and the second bundle extend through a fiber insertion hole 38 formed in the second housing 16. Thereafter, the ends of the first and second packages are attached to one another through a union ring 39.

The above steps may be repeated for additional packaging apparatuses 10 to form a line of packaging apparatuses 10 longitudinally in series with one another, wherein the optical fiber bundles extend along the line.

The exemplary embodiment is capable of securing and organizing the ends of the optical fibers 12 that have previously been connected to a connector 14 in a radial fashion about the longitudinal axis. Since the connectors 14 are loaded in the "half-moon" or U-shaped housing 16, a production worker is able to verify that the fiber 12 is not kinked during the packaging process. Furthermore, the holes 30 or frame-like structure also aids in allowing users to visually observe the fibers 12. The exemplary embodiment loosely captures and holds the connectors 14 while at the same time allowing some movement of the connectors 14 when installed in the packaging apparatus 10 so as not to break the fiber 12 if accidentally pulled on. The exemplary embodiment that includes the retainer clip 24 allows easy and fast connector storage, for example, for storage in a factory, and convenient and fast disassembly in the field.

The exemplary embodiment of the packaging apparatus 10 is modular and can easily be connected in a serial manner to other fiber packaging apparatuses 10 and/or to fiber slack storage spools 42 as necessary to increase the number of connectors 14 to be packaged. The exemplary embodiment is much smaller than the conventional tube that is used, and in particular has a small outer diameter whereby it is conducive to being pulled through the ductwork, conduit and raceways commonly found in the field and buildings. Further, because the packaging assembly of multiple fiber packaging apparatuses 10 is flexible, this allow the business end of the cable to flex as needed in order to be pulled through the ductwork in the field.

Although the above exemplary embodiments have been described, they are not limiting, and it will be understood by those skilled in the art that the present invention should not be limited to the described exemplary aspects and embodiments, but that various changes and modifications can be made within the spirit and scope of the present invention.

What is claimed is:

1. A conductor packaging apparatus for packaging a plurality of conductors, each having a connector disposed at a distal end thereof, the apparatus comprising:
   a housing comprising a first half and a second half detachably attached to the first half; and
   a retaining clip disposed on each of said housing halves,
   wherein the connectors of the plurality of the conductors are disposed between an inner surface and the retaining clip of each of said housing halves,
   wherein the first half and the second half each include a plurality of connecting portions at an inner surface thereof that each retain one of the connectors.

2. The apparatus of claim 1, wherein the inner surface of the first half and the second half each having a substantial U-shape in cross section, and the first half and second half of the housing form a hollow cylindrical shape when attached to one another.

3. The apparatus of claim 1, wherein the housing include a plurality of holes.

4. The apparatus of claim 3, wherein the plurality of holes are formed on the first half of the housing and on the second half of the housing.

5. The apparatus of claim 1, further comprising an attachment portion extending from at least one end of the housing, wherein the housing is attachable to a housing of another apparatus.

6. The apparatus of claim 5, wherein the attachment portion limits a number of degrees of freedom of the housing relative to the another apparatus.

7. The apparatus of claim 1, wherein the housing extends along a longitudinal axis and the connecting portions are radially spaced about the longitudinally axis of the housing.

8. The apparatus of claim 1, wherein a total number of the connecting portions of the housing is twelve.

9. The apparatus of claim 1, wherein a U-shaped slot is formed at each end of each half of the housing to define a conductor insertion hole in each end of the housing when the first half and the second half are attached to one another.

10. The apparatus of claim 1, further comprising a plurality of stoppers extending inwardly from the inner surface of the first half and from the inner surface of the second half that restrict movement of the connector within the connecting portion in the longitudinal direction of the housing.

11. The apparatus of claim 1, wherein the conductors are optical fibers.

12. A conductor packaging assembly comprising a plurality of the conductor packaging apparatuses of claim 1 attached to one another in series.

13. The conductor packaging assembly of claim 12, wherein each two adjacent ones of the conductor packaging apparatus are attached to one another to form an articulated assembly.

14. The conductor packaging assembly of claim 12, further comprising a conductor slack storage spool attached to an end of one of the conductor packaging apparatuses.

15. A method of packaging a plurality of bundles in a plurality of respective housings each having a first half and a second half, each of the bundles including a plurality of conductors, wherein each conductor includes a connector at a first end thereof, the method comprising:
   attaching the connectors of the conductors of a first bundle among the plurality of bundles to one of the first half and the second half of a first housing among the plurality of housings;
   disposing the connectors of the plurality of conductors between each of the inner surfaces of the housing and respective retaining clips,
   gathering the conductors attached to the first housing at a location beyond an end of the first housing; and
   attaching the second half of the first housing to the first half of the first housing to form a package of the first bundle,
   wherein the conductors of the first bundle extend through a conductor insertion hole formed in the first housing.

16. The method according to claim 15, further comprising:
   attaching the connectors of the conductors of a second bundle among the plurality of bundles to one of the first half and the second half of a second housing among the plurality of housings;
   gathering the conductors attached to the second housing at a location beyond an end of the second housing;
   placing the conductors of the first bundle over the first half of the second housing; and attaching the second half of the second housing to the first half of the second housing to form a package of the second bundle,
   wherein the conductors of the first bundle and the second bundle extend through a conductor insertion hole formed in the second housing.

17. The method of claim 15, further comprising attaching the first housing to the second housing.

18. The method of claim 15, wherein the conductors are optical fibers.

19. The apparatus of claim 1, wherein the connectors of the conductors are radially arranged about the inner surface of at least one half of the housing apparatus.

20. The method of claim 15, wherein the connectors of the conductors are radially arranged about the inner surface of at least one half of the housing apparatus.

* * * * *